A. G. ROGERS & H. M. FREEMAN.
Hedge-Trimmer.
No. 216,894.  Patented June 24, 1879.
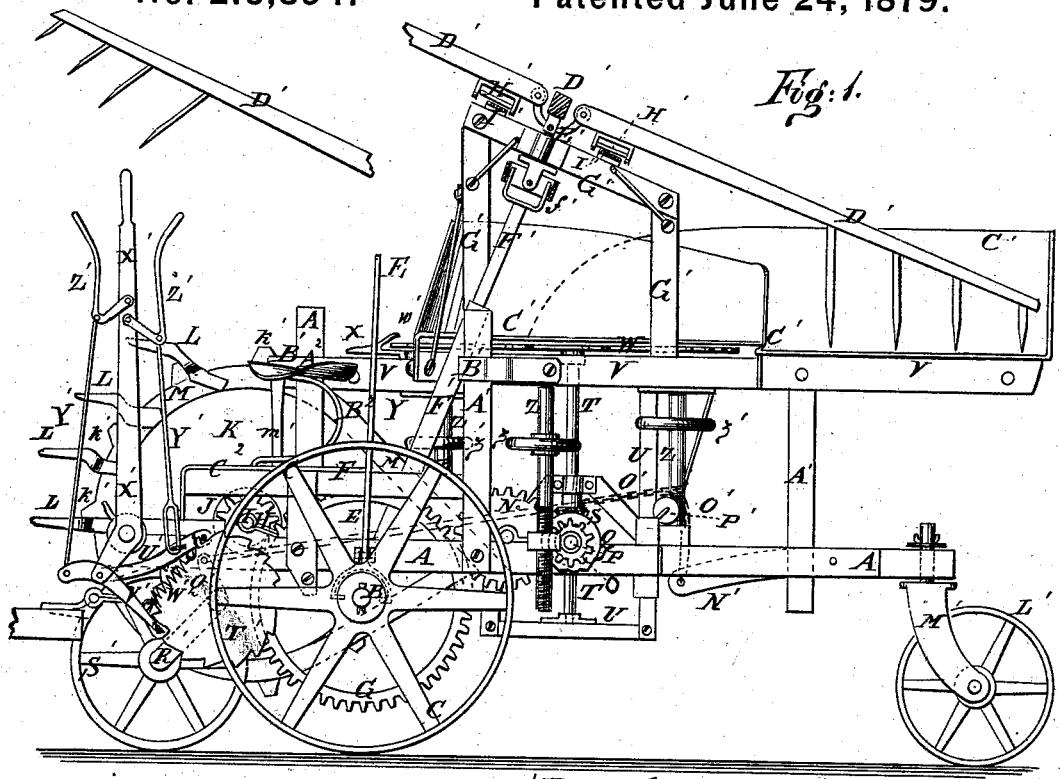
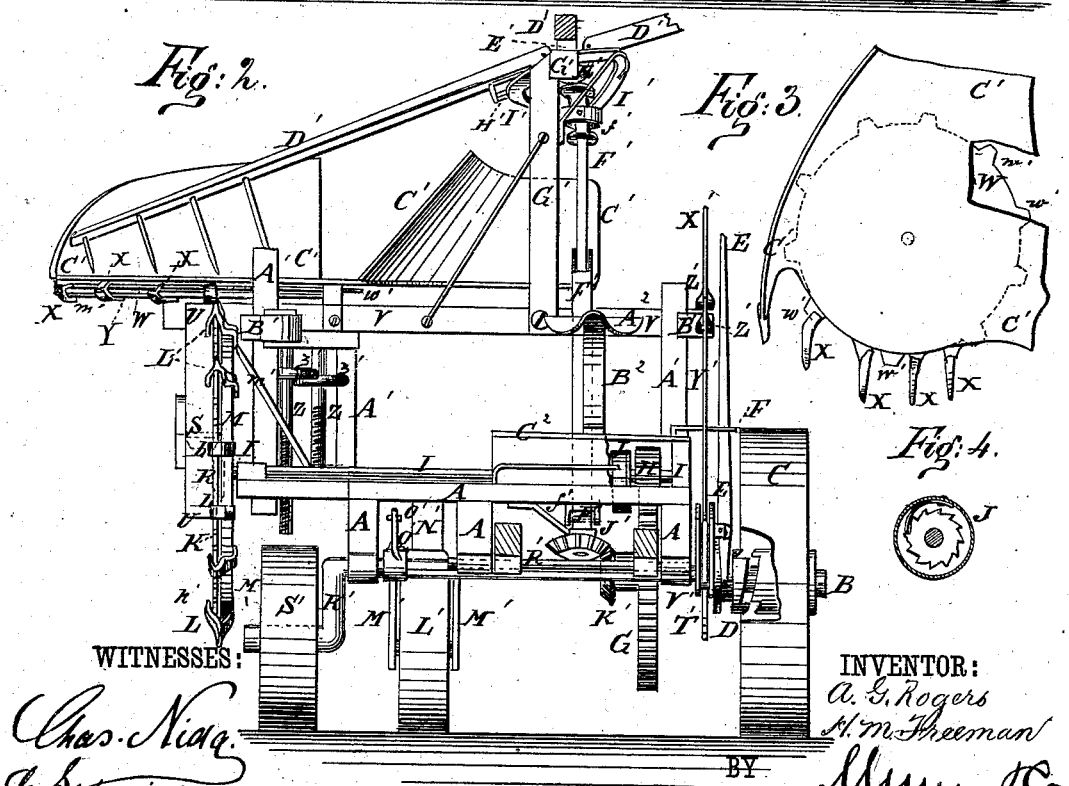
WITNESSES:
Chas. Nidd.
C. Sedgwick
INVENTOR:
A. G. Rogers
H. M. Freeman
BY Munn & Co
ATTORNEYS.

UNITED STATES PATENT OFFICE.

ALBERT G. ROGERS AND HARLOW M. FREEMAN, OF LATHROP, MISSOURI.

IMPROVEMENT IN HEDGE-TRIMMERS.

Specification forming part of Letters Patent No. 216,894, dated June 24, 1879; application filed April 16, 1879.

*To all whom it may concern:*

Be it known that we, ALBERT G. ROGERS and HARLOW M. FREEMAN, of Lathrop, in the county of Clinton and State of Missouri, have invented a new and useful Improvement in Hedge-Trimmers, of which the following is a specification.

Figure 1 is a side view of our improved machine. Fig. 2 is a front view of the same. Fig. 3 is a detail view of the platform and horizontal or top cutter. Fig. 4 is a detail view of the pawls and ratchets for connecting the cutter-shafts with the driving mechanism.

Similar letters of reference indicate corresponding parts.

The object of this invention is to furnish an improved machine for trimming hedges, which shall be so constructed as to trim the top and one side of the hedge at one operation, which may be adjusted to work upon level or inclined ground, and which will allow either of the cutters to be stopped without stopping the other or breaking the machine.

The invention consists in the combination of the caster-wheel, the lever, the chain and pulley, and the arm with the frame, the crank-axle, and its wheel; in the combination of the ratchet-wheel, the two pawls, the spring, the two connecting-rods, the two small bent levers, and the long lever with the crank-axle, its wheel, and the frame of the machine; and in the combination of the curved platform, the rakes, the guide-ring, and the telescopic shaft, provided with the two universal joints, with the adjustable upper frame, that carries the horizontal cutter, and with the driving mechanism, as hereinafter fully described.

A represents the frame of the machine. B is the drive-wheel axle, which revolves in bearings attached to the frame A, and upon its journal revolves the drive-wheel C. Upon the inner end of the hub of the drive-wheel C are formed teeth, with which engage the teeth of the clutch D. The clutch D slides upon the axle B, and is connected with it by a tongue and groove, so that the said clutch D will carry the said axle B with it in its revolution.

To the side of the frame A is pivoted a lever, E, the lower end of which is forked and rides in a ring-groove formed in the clutch D, so that the clutch D may be thrown into and out of gear with the drive-wheel C, as desired. The upper part of the lever E moves along the edge of a bar or plate, F, attached to the frame A, and which has notches formed in it to receive the lever E and lock the clutch D in either position.

To the axle B is attached a large gear-wheel, G, the teeth of which mesh into the teeth of the small gear-wheel H. The gear-wheel H runs loosely upon the cutter-shaft I, and is connected with it by a pawl and ratchet, J, so that the said gear-wheel may carry the said shaft with it in its revolution, and so that should the upper cutter become clogged the lower cutter may continue to revolve until its momentum has been exhausted, thus preventing breakage. The shaft I revolves in bearings attached to the frame A, and to its end is attached a circular sickle, K, having sickle-sections or knives $k'$ attached to or formed upon its edge. The sickle sections $k'$, upon the forward part of the sickle K, pass through guards L attached to the cutter-bar M. The central guard L is straight, and the guards L above and below it are curved toward it, the curvature gradually increasing as the guards are more and more distant from the said central one, so that the twigs may always be cut between the sickle-sections $k'$ and the guards L with a shear-cut. The cutter-bar M is bent into the form of an arc, and is attached to and supported from the frame A, and is further strengthened by braces $m'$, attached to it and to the said frame A.

The teeth of the large gear-wheel G also mesh into the teeth of the intermediate gear-wheel N, which is pivoted to the frame A. The teeth of the intermediate gear-wheel N mesh into the teeth of the gear-wheel O, which is placed upon the shaft P, that drives the upper cutter, and is connected with the said shaft by a pawl and ratchet, Q, so that should the lower sickle become clogged the upper sickle may continue to revolve until its momentum is exhausted, thus preventing breakage. The shaft P revolves in bearings attached to the frame A, and to its end is attached a bevel-gear wheel, R, the teeth of which mesh into the teeth of the bevel-gear wheel S, placed upon the vertical shaft T, and connected with it by a tongue and groove, so that the said shaft may slide longitudinally in the gear-wheel S while being carried around by and with the said gear-wheel in its revolution.

The middle part of the shaft T revolves in bearings attached to the ends of projecting bars of the frame A, and its lower end revolves in a step attached to the bottom bar of the upright frame U, the upper end of which is attached to the adjustable frame V. The upper part of the shaft T revolves in bearings attached to the frame V, and to its upper end is attached a circular sickle, W, having sections or knives $w'$ formed upon or attached to its edge.

The sickle-sections $w'$ pass through guards X, attached to the cutter-bar Y, which is made in the form of an arc of a circle, and is attached to and supported by the adjustable frame V. The inner guard X is about in line with the lower sickle, K, and is made straight. The other guards X are curved, each outer guard being curved a little more than the preceding inner guard, so that the twigs will be cut between the sections $w'$ and the guards X with a shear cut. The frame V is supported by the screws Z, the upper ends of which are swiveled to the said frame V, and their lower parts pass through nuts attached to the frame A, so that the frame V and its attachments may be raised and lowered to adjust it to the height of the hedge by turning the said screws Z. The swiveled screws Z are provided with hand-wheels $Z'$, for convenience in turning them. The frame V is made to move up and down vertically, and the swiveled screws Z are protected from side strain by the guide-bars $A'$, some of which are attached to the frame A and pass through keepers $B^1$, attached to the frame V, and others are attached to the frame V and pass through keepers attached to the frame A. As the twigs are cut by the upper sickle-sections, $w'$, they fall upon the platform $C^1$, placed above the sickle W, and attached to and supported by the frame V, and from which the said cut twigs are swept by the rakes $D'$. The platform $C^1$ is made in the form of a section of a ring-trough, so that the cut twigs, as they are swept from it by the rakes $D'$, may fall at the side of the hedge and in the rear of the machine. The rakes $D'$ are hinged at their inner ends to the arms of an armed plate, $E'$, attached to the upper end of the shaft $F'$, the upper part of which revolves in bearings attached to the inclined top bar of the upright frame $G'$, attached to the adjustable frame V. To the lower sides of the inner parts of the rakes $D'$ are pivoted rollers $H'$, which rest and roll upon a ring-guide, $I'$, attached to the inclined top bar of the frame $G'$, and supported by it and by braces attached to the said frame $G'$. The ring-guide $I'$ is so formed that the rakes $D'$ will move horizontally along the platform $C^1$, to sweep the cut twigs from the said platform, and will be raised out of the way of the driver during the rest of their course.

The shaft $F'$ is made square and telescopic in two parts, one solid and the other hollow, the end of the solid part sliding into the end of the hollow part, so that the said shaft $F'$ may adjust itself in length as the frame B is raised and lowered. The shaft $F'$ has two universal joints, $f'$, formed in it, one near each end, to cause it to run free and prevent it from binding, however the frame V may be adjusted. To the lower end of the shaft $F'$ is attached a bevel-gear wheel, $J'$, the teeth of which mesh into the teeth of the bevel-gear wheel $K'$, attached to the axle B of the drive-wheel C.

The rear end of the machine is supported by the caster-wheel $L'$, the standard $M'$ of which is swiveled to the rear end of the lever $N'$. The lever $N'$ is pivoted at its middle part to and between the projecting ends of the two parallel longitudinal bars of the frame A. To the forward end of the lever $N'$ is attached the end of a chain, $O'$, which passes over a pulley, $P'$, pivoted to a higher bar of the frame A, or to a support attached to the said frame A. The forward end of the chain $O'$ is attached to the outer end of an arm, $Q'$, rigidly attached to the axle $R'$, which works in bearings attached to the forward part of the frame A. Upon the end of the axle $R'$ farthest from the drive-wheel C is formed a crank-arm, upon which revolves the wheel $S'$, that supports the forward inner corner of the frame A, so that the said corner, and with it the sickles, may be raised and lowered to keep the sickles in proper position, whether the machine may be moving along level or inclined ground. To the other or straight end of the axle $R'$ is attached a ratchet-wheel, $T'$, with the teeth of which engage the pull-pawl $U'$ and the push-pawl $V'$. The engaging ends of the pawls $U'$ $V'$ are connected and held against the teeth of the ratchet-wheel $T'$ by a spiral spring, $W'$, the ends of which are attached to the ends of the said pawls. The pawls $U'$ $V'$ are pivoted to the lower end of the lever $X'$, which is pivoted, at a little distance above its said lower end, to the corner of the frame A, and its upper end projects into such a position that it may be conveniently reached and operated by the driver from his seat. To the middle part of the pull-pawl $U'$ and to the projecting end of the push-pawl $V'$ are pivoted the lower ends of the two connecting-rods $Y'$, the upper ends of which are pivoted to the angles of the bent levers $Z'$.

The ends of the short arms of the bent levers $Z'$ are pivoted to the upper part of the lever $X'$, and their long arms project into such positions that they can be conveniently reached and operated by the hand that operates the said lever $X'$. By means of this device the driver, by operating the lever $X'$ and the pawls $U'$ $V'$, can adjust the machine to work upon level or inclined ground, as may be required, without its being necessary for him to stop the team.

A² is the driver's seat, which is attached to the upper arm of a U-shaped spring-standard, B². The lower arm of the spring-standard B² is attached to the outer forward part of the frame A, or to a platform, C², attached to the said frame A.

Having thus described our invention, we claim as new and desire to secure by Letters Patent—

1. The combination of the caster-wheel L' M', the lever N', the chain and pulley O' P', and the arm Q' with the frame A, the crank-axle R', and its wheel S', substantially as herein shown and described.

2. The combination of the ratchet-wheel T', the two pawls U' V', the spring W', the two connecting-rods Y', the two small bent levers Z', and the long lever X' with the crank-axle R', its wheel S', and the frame A, substantially as herein shown and described.

3. The combination of the curved platform C¹, the rakes D', the guide-ring I', and the telescopic shaft F', provided with two universal joints, $f'$ $f'$, with the adjustable upper frame, V, that carries the horizontal cutter, and with the driving mechanism, substantially as herein shown and described.

ALBERT GALLATIN ROGERS.
  HARLOW MILTON FREEMAN.

Witnesses:
  E. N. McKIMM,
  MOSES AMIDON.